United States Patent [19]

Asbill, III

[11] 4,355,983

[45] Oct. 26, 1982

[54] CONTROL PANEL LAYOUT SHEET AND METHOD OF MAKING THE SAME

[75] Inventor: Clarence M. Asbill, III, Richmond, Va.

[73] Assignee: Robertshaw Controls Company, Richmond, Va.

[21] Appl. No.: 248,720

[22] Filed: Mar. 30, 1981

[51] Int. Cl.³ .............................................. G09B 29/00
[52] U.S. Cl. ................................... 434/219; 434/430
[58] Field of Search ............... 434/219, 224, 430, 365, 434/366, 126

[56] References Cited

U.S. PATENT DOCUMENTS

| | | | |
|---|---|---|---|
| 2,655,176 | 10/1953 | Dreyfuss et al. | 434/219 X |
| 3,231,989 | 2/1966 | Jensen | 434/126 |
| 4,093,329 | 6/1978 | Asbill | 339/16 R |
| 4,095,863 | 6/1978 | Hardin | 339/15 |
| 4,095,864 | 6/1978 | Hardin | 339/15 |
| 4,165,139 | 8/1979 | Asbill | 339/15 |

*Primary Examiner*—William H. Grieb
*Attorney, Agent, or Firm*—Candor, Candor & Tassone

[57] ABSTRACT

A control panel layout sheet having on one side thereof first indications indicating control devices that are to be mounted on the control panel to be made from the sheet, second indications indicating the external pneumatic lines that are to be interconnected to the devices, and third indications indicating the external electrical lines that are to be interconnected to the devices whereby the layout sheet is adapted to be utilized as a guide for constructing a control panel having all of the control devices and external pneumatic and electrical lines thereon. The first, second and third indications are disposed on the sheet in substantially the exact location that the control devices and external pneumatic and electrical lines will take in a respective control panel to be made therefrom so that the layout sheet substantially simulates a completed control panel when facing the same.

40 Claims, 7 Drawing Figures

CONTROL PANEL LAYOUT SHEET AND METHOD OF MAKING THE SAME

BACKGROUND OF THE INVENTION

1. Field of the Invention

This invention relates to an improved control panel layout sheet and to a method of making the same.

2. Prior Art Statement

It is known to provide a control panel layout sheet having thereon schematic representation of actual control devices that are to be mounted on a control panel that can be made from the sheet by utilizing the sheet as a guide. In addition, such sheet is marked with lines indicating the external pneumatic lines that are to be interconnected to certain of the control devices and the external electrical lines that are to be interconnected to certain of the control devices whereby the layout sheet is adapted to be utilized as a guide for constructing or repairing a control panel having the control devices and external pneumatic and electrical lines interconnected thereon.

However, it has been found according to the teachings of this invention that there is no visual similarity between the arrangement of the control devices and pneumatic and electrical lines therefor on the layout sheet and the control panel construction constructed therefrom because such control devices have certain external lines interconnected on one side thereof and certain other external lines interconnected to other sides thereof so that the prior known control panel layout sheet is difficult to utilize in the field by a service man trying to trace various circuits in the control panel that requires such servicing.

In addition, it requires a skilled worker to take the prior known control panel layout sheet and construct an actual control panel therefrom because the only guidance given by the prior known control panel layout sheet is how the external pneumatic and electrical lines are to connect to the various parts of the various control devices.

It is also known to provide a manifold means to detachably carry on one side thereof a plurality of pneumatically and electrically operated control devices, that one side of the manifold means also having external interconnection means for interconnecting to external pneumatic and electrical lines whereby the external pneumatic and electrical lines can be interconnected to the same side of the manifold means that the units are interconnected thereto.

Such pneumatically and electrically operated control units are adapted to have plug-in means thereof respectively cooperating with plug-in means of the pneumatic means and electrical means of the manifold means at the one side of the manifold means.

For example see the following four U.S. patents:
(1) U.S. patent to Asbill, III, U.S. Pat. No. 4,093,329
(2) U.S. patent to Hardin, U.S. Pat. No. 4,095,863
(3) U.S. patent to Hardin, U.S. Pat. No. 4,095,864
(4) U.S. patent to Asbill, III, U.S. Pat. No. 4,165,139

It appears that the manifold means in each of the above items (1)-(4) has the interconnection means for interconnecting to the external pneumatic and electrical lines disposed on the same side of the manifold means that the control devices are detachably interconnected thereto and that the completed manifold means comprises a control panel.

SUMMARY OF THE INVENTION

It is a feature of this invention to provide an improved control panel layout sheet that is adapted to be utilized as a guide for constructing and/or repairing a control panel.

In particular, it was found according to the teachings of this invention that when making a control panel from one of the manifold means of the aforementioned four U.S. patents, the control panel layout sheet can be made to substantially simulate the resulting control panel made therefrom because such control panel has the external interconnection means for interconnecting to the external pneumatic and electrical lines on the same side of the manifold means to which the control devices are interconnected thereto.

Thus, because a person facing the completed manifold means of one of the aforementioned U.S. patents can make all adjustments and interconnections thereto from that same side of the manifold means that that person plugs-in or attaches various control devices thereto, the control panel layout sheet of this invention readily permits a person to hold the layout sheet in side-by-side relation to the actual control panel and easily find any external pneumatic and/or electrical lines and/or control device as the case may be because of substantially the same visual arrangement of parts representation on the control panel layout sheet and the actual parts of the control panel constructed therefrom.

Accordingly, one embodiment of this invention provides a control panel layout sheet having on one side thereof first means indicating control devices that are to be mounted on a control panel to be made from the sheet, second means indicating the external pneumatic lines that are to be interconnected to the devices, and third means indicating the external electrical lines that are to be interconnected to the devices whereby the layout sheet is adapted to be utilized as a guide for constructing a control panel having all of the control devices and the external pneumatic and electrical lines thereon. The means are disposed on the sheet in substantially the exact locations thereon that the controls devices and external pneumatic and electrical lines will take in the respective control panel to be made therefrom so that the layout sheet substantially simulates a completed control panel when facing the same.

Accordingly, it is an object of this invention to provide an improved control panel layout sheet having one or more of the novel features of this invention as set forth above or hereinafter shown or described.

Another object of this invention is to provide an improved method of making a control panel layout sheet, the method of this invention having one or more of the novel features of this invention as set forth above or hereinafter shown or described.

Other objects, uses and advantages of this invention are apparent from a reading of this description which preceeds with reference to the accompanying drawings forming a part thereof and wherein:

DESCRIPTION OF THE PREFERRED EMBODIMENTS

Figure 1:
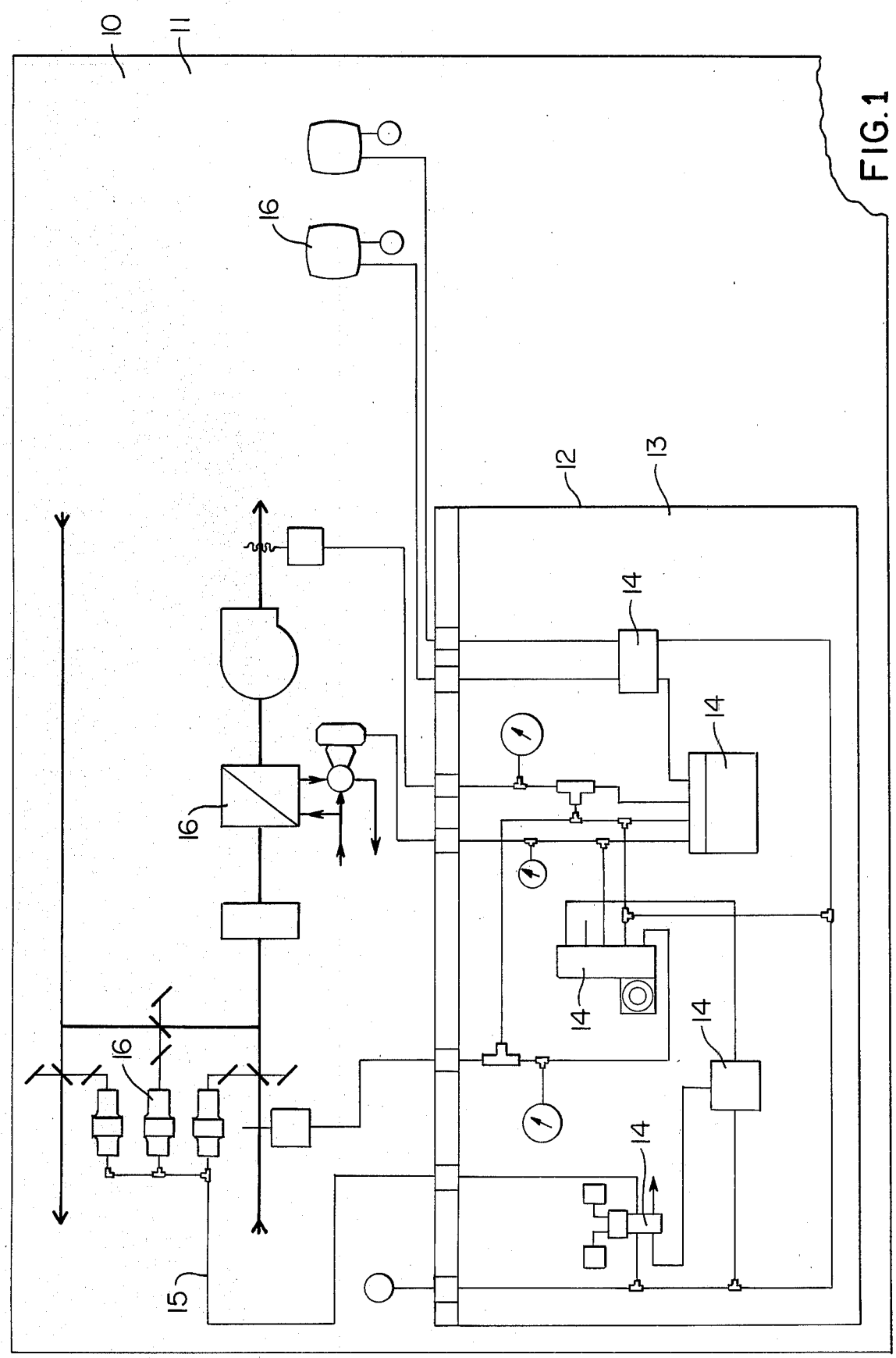
FIG. 1 is a front view of a prior art control panel layout sheet.

While the various features of this invention are hereinafter described and illustrated as being particularly adapted to provide a control panel layout sheet for constructing a manifold means for pneumatically and electrically operated control devices, it is to be understood that the various features of this invention can be utilized singly or in any combination thereof to provide a control panel layout sheet for other types of control devices as desired, such as control devices that are only pneumatically operated or just electrically operated or a combination thereof.

Therefore, this invention is not to be limited to only the embodiments illustrated in the drawings, because the drawings are merely utilized to illustrate one of the wide variety of uses of this invention.

Referring now to FIG. 1, a prior art control panel layout sheet is indicated by the reference numeral 10 and comprises a paper sheet or the like having on the front side 11 thereof a substantially rectangular border 12 that depicts a control panel 13 which is to be utilized to hold thereon a plurality of control devices 14 that are to be interconnected by external pneumatic lines 15 to a plurality of control devices 16 that are to be located remote from the control panel 13 when the control panel 13 is utilized and is interconnected to the remotely disposed control devices 16 by the external pneumatic lines 15.

Such prior known control panel layout sheet 10 has been utilized to construct an actual control panel 13 containing the control devices 14 and being interconnected to external pneumatic lines 15. However, the control panel that is constructed from the prior art control panel layout sheet 11 does not look like the arrangement on the drawing 13 because the drawing 13 merely represents the control devices 14 in a schematic manner and with the control devices 14 located at random within the control panel border 12.

In particular, the control devices 14 are normally located within the border 12 of the control panel 13 in the form that makes the connections to the control devices 16 outside the panel area 12 as short and as straight as possible. When the actual panel is built from the prior art layout sheet 10, the control devices 14 will not be arranged within the panel border as shown on the control panel layout 10, but will be arranged to make the actual external pneumatic and electrical connections 15 as simple and uncluttered as possible. Therefore, with the conventional method of making the control panel layout sheet 10, the diagram 13 of the control panel does not match the physical arrangement of the control panel itself. This mismatch causes time to be wasted during installation of the panel, during calibration of the panel and during subsequent servicing of the panel because in each case, the tubings and wiring connections and interconnections must be traced. This is especially time consuming if the control system appears to be malfunctioning.

Figure 2:
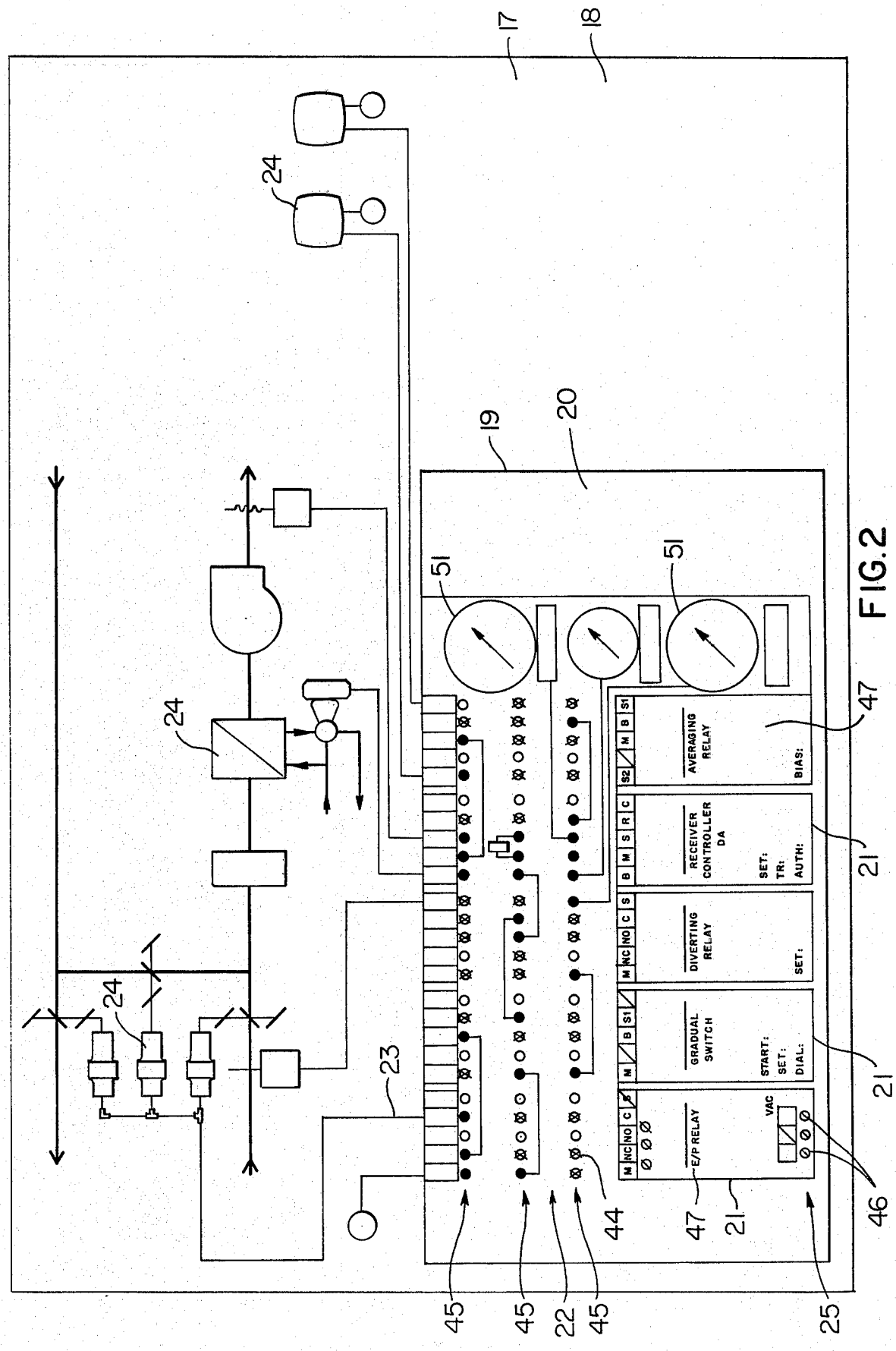
FIG. 2 is a view similar to FIG. 1 and illustrates the control panel layout sheet of this invention.

In contrast, FIG. 2 illustrates the improved control panel layout sheet of this invention that is indicated by the reference numeral 17 and comprises a paper sheet or the like having on the front side 18 thereof a substantially rectangular border 19 defining a control panel 20 which contains a plurality of control devices 21 disposed in side-by-side relation.

The diagram of the control panel 20 of this invention has means 22 thereon which provides the interconnection between the pneumatic means of the control devices 21 and external pneumatic lines 23 which interconnect certain control devices 21 together or interconnect to remotely disposed controlled devices depicted on the layout sheet 17 by the reference numerals 24.

One or more of the control devices 21 illustrated on the control panel 20 can be provided with electrical interconnection means 25 to which external electrical lines (see external electrical lines 26 in FIG. 6) can be interconnected, to interconnect to the various electrical parts of the control devices 24 as the case may be.

In any event, the control panel layout sheet 17 of this invention of FIG. 2 provides a control panel representation 20 that is adapted to operate the controlled devices 16 as set forth in the prior art control panel layout sheet 10 of FIG. 1 so that the same system can be controlled by the control panel that is to be built from the layout sheet 17 of this invention as the control panel that is to be built from the layout sheet 10 of FIG. 1.

However, in contrast, the control panel 20 depicted on the layout sheet 17 of this invention substantially simulates the finally constructed control panel when facing the same whereas the control panel 13 depicted on the control layout sheet 10 of FIG. 1 does not resemble the finally produced control panel made therefrom for the reason previously set forth.

Figure 3:
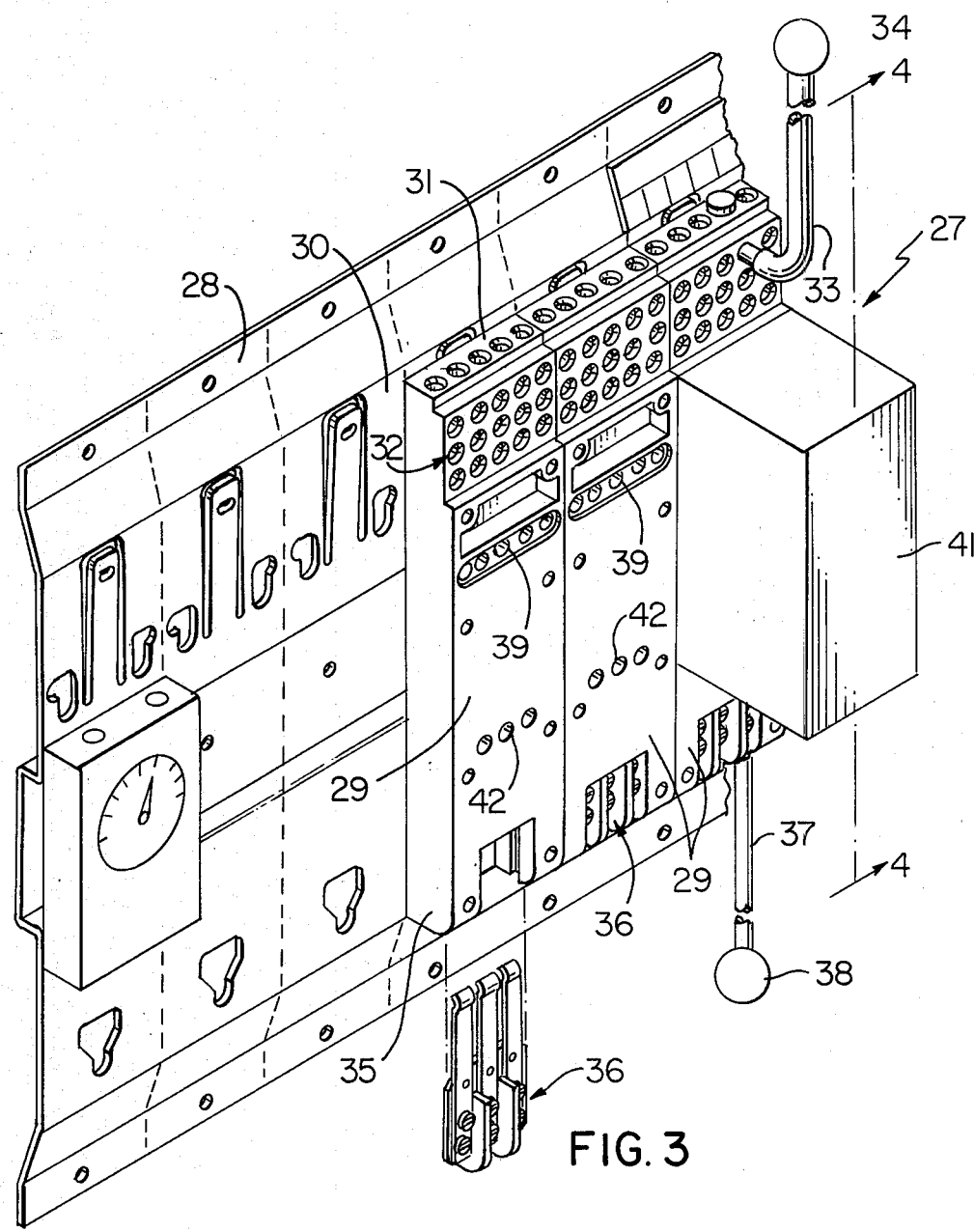
FIG. 3 is a perspective view of a control panel that can be made from a control panel layout sheet of this invention.

For example, reference is now made to FIG. 3 wherein a control panel is generally indicated by the reference numeral 27 and is constructed from the teaching of the aforementioned U.S. patent to Hardin, U.S. Pat. No. 4,095,864 in a manner now to be described. However, it is to be understood that all of the aforementioned four United States patents are being incorporated in this disclosure by reference thereto for further teachings of the structure and operation thereof.

Figure 4:
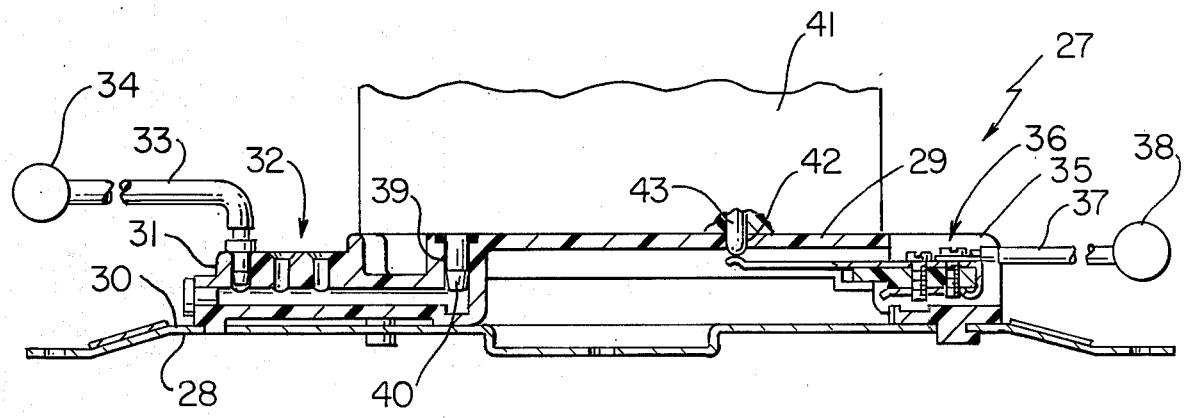
FIG. 4 is a fragmentary cross-sectional view taken on line 4—4 of FIG. 3.

The control panel 27 of FIGS. 3 and 4 comprises a frame plate 28 adapted to detachably carry a plurality of manifold modules 29 on the front side 30 thereof with the manifold modules 29 being disposed in side-by-side relation and each having at one end 31 thereof external pneumatic interconnection means 32 for interconnecting to one or more external pneumatic lines 33 that are adapted to be respectively interconnected to pneumatically operated controlled devices 34 and the like.

Each manifold module 29 has at the other end 35 thereof external electrical interconnection means 36 for interconnecting to one or more external electrical lines 37 adapted to be respectively interconnected to electrically operated controlled devices 28.

Thus, it can be seen that each manifold module 29 has the external interconnection means 32 and 36 thereof exposed on the same side 30 of the frame plate 28 that the manifold module 29 is interconnected thereto.

Each manifold module 29 has plug-in pneumatic interconnection means 39 for receiving plug-in pneumatic interconnection means 40 of a control device 41 disposed thereagainst and carried in the manner illustrated in FIG. 4 and has plug-in electrical means 42 for receiving plug-in electrical means 43 of the respective control device 41 to operatively interconnect the pneumatic means and electrical means (not shown) of the respective control device 41 respectively to the external pneumatic interconnection means 32 and to the external electrical interconnection means of the respective manifold module 29 carrying that control device 41.

Therefore, it can be seen that the control panel 27 is adapted to be made up of a plurality of manifold modules 29 secured to the front side 30 of the frame 28 and each module 29 is adapted to have a pneumatically and electrically operated control device 41 fastened to the front side thereof so that the control devices 41 are disposed on the same side of the manifold means control panel 27 that the interconnection means 32 and 35 are provided to interconnect to external pneumatic lines 33 and external electrical lines 37. In this manner, all servicing of the manifold means or control panel 27 is from the front side thereof in the unique manner claimed and set forth in the aforementioned four United States patents.

Also, it can be seen that the control devices 41 of the control panel 27 are adapted to be disposed in side-by-side relation and be disposed intermediate the external interconnection means 32 and 36 of the manifold modules 29 so that the pneumatic lines 33 and electrical lines 37 can be easily interconnected thereto.

Referring now to the control panel layout sheet 17 of this invention of FIG. 2, it can be seen that the control devices 21 thereof closely represents the control devices 41 of the control panel 27 of FIG. 3 with the external interconnection means 22 on the control panel diagram 20 comprising a plurality of circles 44 arranged in a plurality of rows 45 with a plurality of circles 44 in each row 45 being provided for each control device 21 in the same manner as the plug-in pneumatic interconnection means 32 of each manifold module 29 is provided for each control device 41.

Similarly, the electrical interconnection means 25 of the control panel diagram 20 of FIG. 2 comprises a plurality of circles 46 for each control device 21 which simulate the terminal screws of the external electrical interconnection means 36 of the manifold modules 29 of FIGS. 3 and 4.

Therefore, by further drawing on the control panel layout sheet 17 of this invention the external interconnection lines 23 between the desired circles 44 of the pneumatic interconnection means 22 as well as the external lines 23 and 26 (FIG. 6) for the interconnection of the external lines 23 and 26 to the interconnection means 22 and 26, it can be seen that the control panel depiction 20 on the layout sheet 17 of FIG. 2 substantially simulates the completed control panel that would be made in the manner illustrated in FIGS. 3 and 4 so that one could hold the sheet 17 adjacent the completed control panel 27 and determine what the control devices 41 are for by looking at the labelling 47 on the control device representation 21 of FIG. 2 because the control device representations are in substantially the same location on the panel 20 as the control devices 41 are located on the control panel 27. Likewise, to determine where the external lines 33 and 37 of the completed control panel 27 extend, one can trace the exact location of the external lines 23 and 26 from the control panel diagram 20 to the desired remotely disposed control device or devices 24.

In this manner, the control device location on the control panel diagram 20 will closely match the control device location within the actual panel 27. Pneumatic tubing connections shown on the control panel diagram 20 will closely match the actual tubing connections within the actual panel 27. The location of wiring terminations on the control panel diagram 20 will also closely match the location of the electrical wiring within the actual control panel 27.

Also, a standard set of engineering symbols can be used to make the appearance of the control panel diagram 20 match, as closely as possible, the appearance of the control devices 41 mounted within the panel construction 27 and these symbols could be in the form of peel-off transparent symbols which will be fixed to drafting paper or the like to form the basis of the control panel layout sheet 17 of this invention. The interconnections between the devices 21 can then be drawn in pencil on the sheet as well as the interconnections to the controlled devices 24 that also have been drawn on the sheet of drafting paper or the like.

Figure 7:
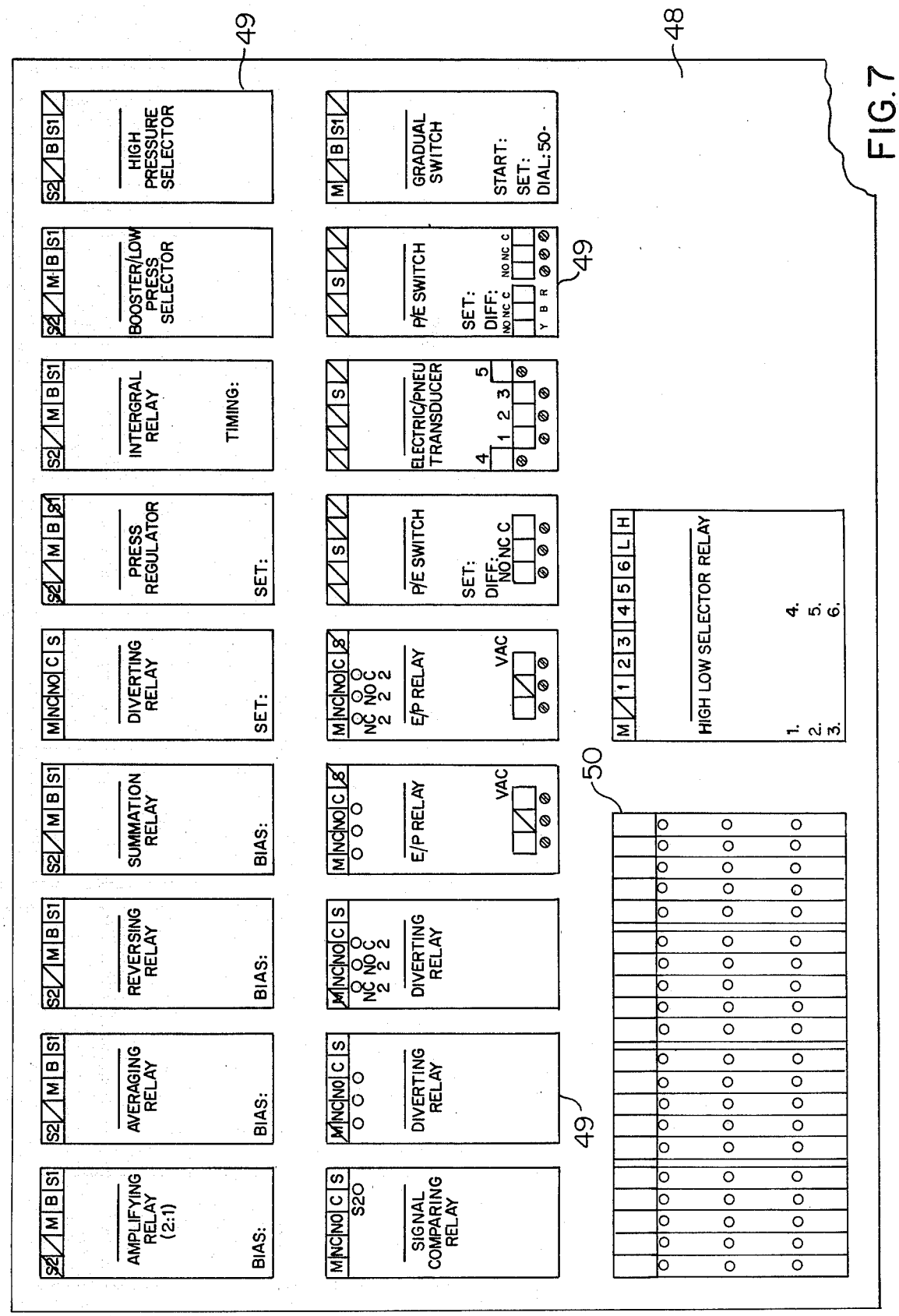
FIG. 7 is a front view of a master sheet of this invention that can be utilized to form the control panel layout sheets of this invention.

In particular, reference is now made to FIG. 7 wherein a master sheet 48 of this invention is provided and has a plurality of peel-off transparent labels 49 thereon depicting various types of control devices 21 which can be utilized to make up a control panel layout sheet 17 of this invention.

In addition, a transparent peel-off strip 50 is disposed on the master sheet 48 or other master sheet to depict the pneumatic interconnection means 22 having the rows 45 of circles 44 for a plurality of control devices 21 in a continous strip manner. Thus, a person can peel and cut off the desired length of the strip 50 to be placed on the layout sheet 17 to depict the pneumatic interconnection means 22 of the control panel layout sheet 17 of this invention.

Similarly, gauge symbols as represented by the reference numerals 51 in FIG. 2 can be utilized on the layout sheet 17 and be provided from a master sheet (not shown) as desired.

Figure 5:
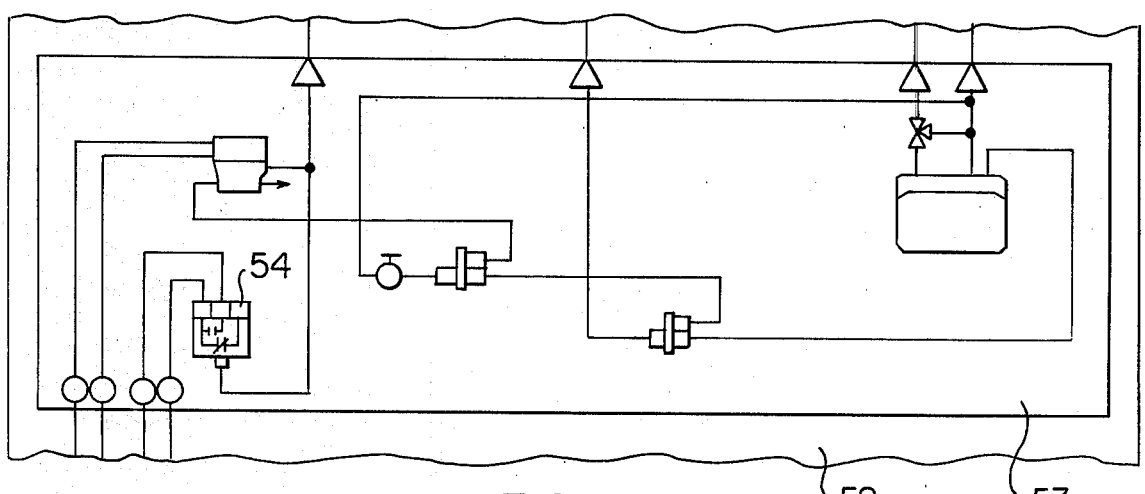
FIG. 5 is a fragmentary front view of another prior art control panel layout sheet.

FIG. 5 illustrates another prior art layout sheet 52 having a control panel representation 53 thereon wherein the control devices 54 are randomly placed thereon and does not resemble the control panel subsequently made therefrom.

Figure 6:
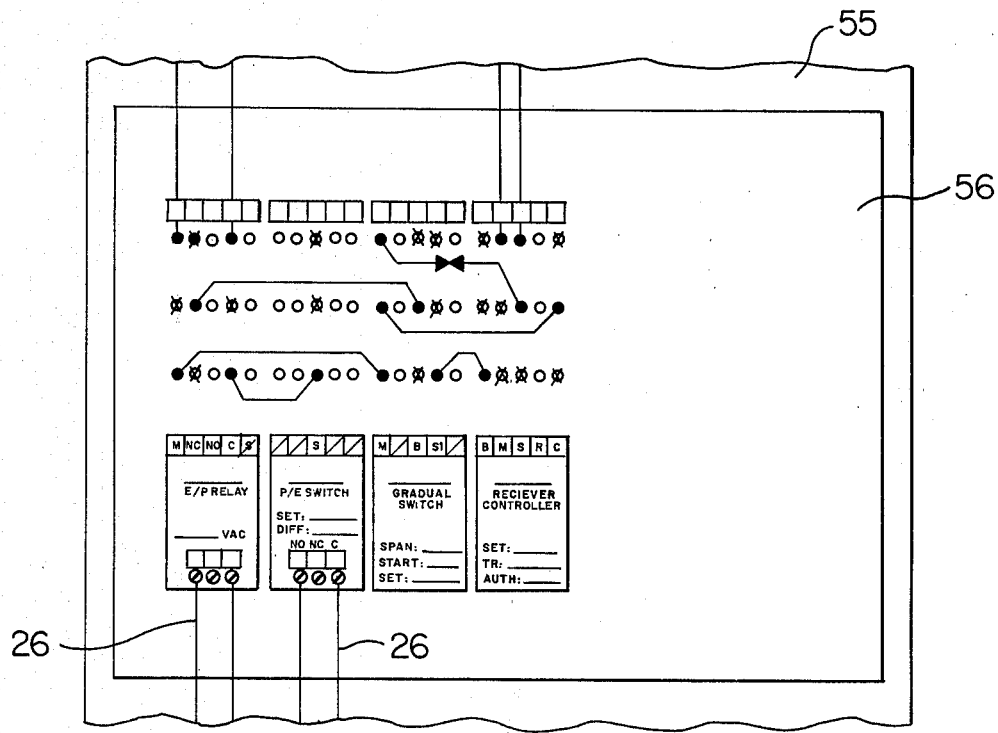
FIG. 6 is a view similar to FIG. 5 and illustrates a control panel layout sheet of this invention.

In contrast, FIG. 6 illustrates the improved control panel layout sheet 55 of this invention having a control panel representation 56 thereon formed by the method of this invention to substantially simulate the resulting control panel when the same is made from the control panel layout sheet 55 in the manner illustrated in FIG. 3, the control panel representation 56 of FIG. 6 providing the same control function as the control panel representation 53 on the prior art layout sheet 52 of FIG. 5.

Therefore, it can be seen that many different types of control panels can be made from corresponding control panel layout sheets of this invention that have been made by the method of this invention now to be described.

When a particular control panel layout sheet is to be made by the method of this invention, a sheet of paper is utilized and a border 19 can be drawn on the same in the manner illustrated in FIG. 2 to provide the control panel representation 20. Thereafter, the desired control device symbols 49 are peeled from the master sheet or sheets 48 and placed in side-by-side relation in the desired location on the panel representation 20 that the corresponding actual control devices are to be located onto a control panel either by making the control panel by the method set forth in the aforementioned four United States patents or by other methods of making control panels as the case may be. The desired length of the strip 50 for the pneumatic interconnection means 22 is removed from the master sheet 48 and placed at the top of the control panel representation 20. It can be seen that the electrical interconnection means 25 are disposed at the bottom of the control panel representation 20 with the control devices 21 being shown as intermediate such interconnection means 22 and 25. Of course, not all of the control devices 21 have the electrical interconnection means 25 as not all of the control devices have electrically operated parts.

Therafter, the external interconnection means 23 and 26 are drawn to or from the control devices 21 at the interconnection means 22 and 25, the desired control devices 24 also being drawn into the sheet in any suitable manner.

Once the control panel layout sheet 17 has been completed, copies thereof can be made to not only be utilized in manufacturing an actual control panel from the control panel representation 20, but also be utilized by service men in the field for servicing the completed control panels once the same are placed in the field.

Therefore, it can be seen that the method of this invention produces a control panel layout sheet which substantially simulates the actual control panel that can be made therefrom because the same looks substantially like the resulting control panel when a person faces the same.

Thus, this invention provides an improved control panel layout sheet and method of making the same.

While the terms "control panel layout sheet" have been utilized for describing the sheets 10, 17, 52 and 55, other terms commonly utilized are "control layout," "control diagram," "control schematic," "Schematic diagram," "schematic control diagram," etc., and in some cases where a schematic representation of the system being controlled will be included as part of the sheet (such as including controlled devices 16 and 24), the sheet is usually referred to as a "system flow diagram" or simply as a "flow diagram." However, it is not necessary to include a representation of the system controlled as the unique feature of this invention is the control panel representation and not what it controls.

While the forms and methods of this invention now preferred have been illustrated and described as required by the Patent Statute, it is to be understood that other forms and method steps can be utilized and still fall within the scope of the appended claims.

What is claimed is:

1. In a method of making a control panel layout sheet having on one side thereof first means indicating control devices that are to be mounted on a control panel to be made from said sheet, second means indicating the external pneumatic lines that are to be interconnected to said devices, and third means indicating the external electrical lines that are to be interconnected to said devices whereby said layout sheet is adapted to be utilized as a guide for constructing a control panel having said control devices and said external pneumatic and electrical lines thereon, the improvement comprising the step of disposing said means on said sheet in substantially the exact location thereon that the control devices and external pneumatic and electrical lines will take in the respective control panel to be made therefrom so that said layout sheet substantially simulates a completed control panel when facing the same.

2. A method as set forth in claim 1 and including the step of disposing fourth means on said one side of said sheet to indicate pneumatic interconnection means of said respective control panel to which said external pneumatic lines can be interconnected thereto.

3. A method as set forth in claim 2 and including the step of disposing said fourth means on said sheet adjacent one end thereof.

4. A method as set forth in claim 2 and including the steps of forming said fourth means on a master sheet, removing a selected portion of said fourth means from said master sheet, and disposing said removed selected portion of said fourth means on said layout sheet to indicate said pneumatic interconnection means of said respective control panel.

5. A method as set forth in claim 1 and including the step of disposing fourth means on said one side of said sheet to indicate electrical interconnection means of said respective control panel to which said external electrical lines can be interconnected thereto.

6. A method as set forth in claim 5 and including the step of disposing said fourth means on said sheet adjacent one end thereof.

7. A method as set forth in claim 1 and including the step of disposing fourth means on said one side of said sheet to indicate pneumatic interconnection means of said respective control panel to which said external pneumatic lines can be interconnected thereto and to indicate electrical interconnection means of said respective control panel to which said external electrical lines can be interconnected thereto.

8. A method as set forth in claim 7 and including the step of disposing the part of said fourth means that defines said pneumatic interconnection means on said sheet adjacent one end thereof and the part of said fourth means that defines said electrical interconnection means on said sheet adjacent an end thereof opposite said one end.

9. A method as set forth in claim 8 and including the step of disposing said first means on said sheet intermediate said second and third means.

10. A method as set forth in claim 9 and including the step of disposing said fourth means on said sheet so that a plurality of external pneumatic lines of said second means can be provided for each control device of said first means.

11. A method as set forth in claim 10 wherein said step of disposing said fourth means on said sheet permits said plurality of external pneumatic lines for each control device to be in side-by-side relation.

12. A method as set forth in claim 9 and including the step of disposing said fourth means on said sheet so that a plurality of external electrical lines of said third means can be provided for each control device.

13. A method as set forth in claim 12 wherein said step of disposing said fourth means on said sheet permits said plurality of external electrical lines for each control device to be in side-by-side relation.

14. A method as set forth in claim 9 wherein said step of disposing said first means on said sheet intermediate said second and third means includes the step of disposing said control devices of said first means in side-by-side relation.

15. A method as set forth in claim 1 and including the step of disposing fourth means on said one side of said sheet to indicate units remote from said control panel that are to be controlled by said control devices of said first means.

16. A method as set forth in claim 15 and including the step of disposing said second means on said sheet to indicate to which units said external pneumatic lines are to interconnect therewith.

17. A method as set forth in claim 15 and including the step of disposing fifth means on said sheet to indicate a border for said respective control panel.

18. A method as set forth in claim 1 and including the steps of forming said first means on a master sheet, removing selected parts of said first means from said master sheet, and disposing said removed selected parts of said first means on said layout sheet to indicate said control devices of said respective control panel.

19. In a method of making a control panel layout sheet having on one side thereof first means indicating control devices that are to be mounted on a control panel to be made from said sheet, second means indicating the external pneumatic lines that are to be interconnected to said devices, and third means indicating the external electrical lines that are to be interconnected to said devices whereby said layout sheet is adapted to be utilized as a guide for constructing a control panel having said control devices and said external pneumatic and electrical lines thereon, the improvement comprising the steps of disposing said means on said sheet in substantially the exact location thereon that the control devices and external pneumatic and electrical lines will take in the respective control panel to be made therefrom so that said layout sheet substantially simulates a completed control panel when facing the same, and disposing fourth means on said one side of said sheet to indicate pneumatic interconnection means of said respective control panel to which said external pneumatic lines can be interconnected thereto, said step of disposing said fourth means on said sheet to indicate said pneumatic interconnection means includes the step of forming said pneumatic interconnection means as a plurality of spaced apart circles on said sheet.

20. A method as set forth in claim 19 wherein said step of forming said pneumatic interconnection means as a plurality of spaced apart circles on said sheet includes the step of disposing said circles in aligned rows thereof.

21. In a control panel layout sheet having on one side thereof first means indicating control devices that are to be mounted on a control panel to be made from said sheet, second means indicating the external pneumatic lines that are to be interconnected to said devices, and third means indicating the external electrical lines that are to be interconnected to said devices whereby said layout sheet is adapted to be utilized as a guide for constructing a control panel having said control devices and said external pneumatic and electrical lines thereon, the improvement wherein said means are disposed on said sheet in substantially the exact location thereon that the control devices and external pneumatic and electrical lines will take in the respective control panel to be made therefrom so that said layout sheet substantially simulates a completed control panel when facing the same.

22. A control panel layout sheet as set forth in claim 21 and including fourth means disposed on said one side of said sheet to indicate pneumatic interconnection means of said respective control panel to which said external pneumatic lines can be interconnected thereto.

23. A control panel layout sheet as set forth in claim 22 wherein said fourth means is disposed on said sheet adjacent one end thereof.

24. A control panel layout sheet as set forth in claim 22 wherein said fourth means comprises part of a master sheet.

25. A control panel layout sheet as set forth in claim 21 and including fourth means disposed on said one side of said sheet to indicate electrical interconnection means of said respective control panel to which said external electrical lines can be interconnected thereto.

26. A control panel layout sheet as set forth in claim 25 wherein said fourth means is disposed on said sheet adjacent one end thereof.

27. A control panel layout sheet as set forth in claim 21 and including fourth means disposed on said one side of said sheet to indicate pneumatic interconnection means of said respective control panel to which said external pneumatic lines can be interconnected thereto and to indicate electrical interconnection means of said respective control panel to which said external electrical lines can be interconnected thereto.

28. A control panel layout sheet as set forth in claim 27 wherein part of said fourth means that defines said pneumatic interconnection means on said sheet is disposed adjacent one end thereof and the part of said fourth means that defines said electrical interconnection means on said sheet is disposed adjacent an end thereof opposite said one end.

29. A control panel layout sheet as set forth in claim 28 wherein said first means is disposed on said sheet intermediate said second and third means.

30. A control panel layout sheet as set forth in claim 29 wherein said fourth means is disposed on said sheet so that a plurality of external pneumatic lines of said second means can be provided for each control device of said first means.

31. A control panel layout sheet as set forth in claim 30 wherein said fourth means is disposed on said sheet in a manner to permit said plurality of external pneumatic lines for each control device to be in side-by-side relation.

32. A control panel layout sheet as set forth in claim 29 wherein said fourth means is disposed on said sheet so that a plurality of external electrical lines of said third means can be provided for each control device.

33. A control panel layout sheet as set forth in claim 32 wherein said fourth means is disposed on said sheet in a manner to permit said plurality of external electrical lines for each control device to be in side-by-side relation.

34. A control panel layout sheet as set forth in claim 29 wherein said first means is disposed on said sheet so that said control devices of said first means are disposed in side-by-side relation.

35. A control panel layout sheet as set forth in claim 21 and including fourth means disposed on said one side of said sheet to indicate units remote from said control panel that are to be controlled by said control devices of said first means.

36. A control panel layout sheet as set forth in claim 35 wherein said second means is disposed on said sheet to indicate to which units said external pneumatic lines are to interconnect therewith.

37. A control panel layout sheet as set forth in claim 35 and including fifth means disposed on said sheet to indicate a border for said respective control panel.

38. A control panel layout sheet as set forth in claim 21 wherein said first means comprises part of a master sheet.

39. In a control panel layout sheet having on one side thereof first means indicating control devices that are to be mounted on a control panel to be made from said sheet, second means indicating the external pneumatic lines that are to be interconnected to said devices, and third means indicating the external electrical lines that are to be interconnected to said devices whereby said layout sheet is adapted to be utilized as a guide for constructing a control panel having said control devices and said external pneumatic and electrical lines thereon, the improvement wherein said means are disposed on said sheet in substantially the exact location thereon that the control devices and external pneumatic and electrical lines will take in the respective control panel to be made therefrom so that said layout sheet substantially simulates a completed control panel when facing the same, and fourth means disposed on said sheet to indicate pneumatic interconnection means of said respective control panel to which said external pneumatic lines can be interconnected thereto, said fourth means that is disposed on said sheet to indicate said pneumatic interconnection means comprising a plurality of spaced apart circles on said sheet.

40. A control panel layout sheet as set forth in claim 39 wherein said circles are disposed in aligned rows thereof.

* * * * *